US 8,040,997 B2

(12) United States Patent
Sano et al.

(10) Patent No.: US 8,040,997 B2
(45) Date of Patent: Oct. 18, 2011

(54) PH ADJUSTING SYSTEM AND PH ADJUSTING METHOD (75) Inventors: Hiroshi Sano, Tokyo (JP); Takafumi Ogino, Tokyo (JP); Yoshiyuki Tanigawa, Tokyo (JP); Shiro Kato, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 432 days.

(21) Appl. No.: 12/279,104

(22) PCT Filed: Feb. 28, 2008

(86) PCT No.: PCT/JP2008/053536
§ 371 (c)(1),
(2), (4) Date: Aug. 12, 2008

(87) PCT Pub. No.: WO2009/084246
PCT Pub. Date: Jul. 9, 2009

(65) Prior Publication Data
US 2010/0232560 A1     Sep. 16, 2010

(30) Foreign Application Priority Data
Dec. 27, 2007   (JP) .................................. 2007-337617

(51) Int. Cl.
*G21C 9/00*        (2006.01)
(52) U.S. Cl. .................. 376/306; 376/305; 376/277
(58) Field of Classification Search .................. 376/306, 376/305, 277
See application file for complete search history.

(56) References Cited

U.S. PATENT DOCUMENTS

| | | | | |
|---|---|---|---|---|
| 4,587,080 A | * | 5/1986 | Johnson ......................... | 376/282 |
| 4,609,523 A | * | 9/1986 | Gerlowski ....................... | 376/309 |
| 4,753,771 A | * | 6/1988 | Conway et al. ................. | 376/282 |
| 5,255,296 A | * | 10/1993 | Schultz .......................... | 376/299 |
| 5,295,170 A | * | 3/1994 | Schulz ........................... | 376/309 |

FOREIGN PATENT DOCUMENTS

| | | |
|---|---|---|
| JP | 52-56297 A | 5/1977 |
| JP | 62-115394 A | 5/1987 |
| JP | 62-276499 A | 12/1987 |

(Continued)

OTHER PUBLICATIONS

J. A. Reinhart Site Director, Fort Calhoun, Unit 1, Licence Amendment Request (LAR) "Change of Containment Building Sump Buffering Agent from Trisodium Phosphate to Sodium Tetraborate", NRC public documents, Nuclear Regulatory Commission, pp. 1-29, Aug. 21, 2006.

The Genkai Nuclear Power Plant Application for Permission of a Change in the Nuclear Recator (A change in Nos. 3 and 4 Nuclear Reactor Facilities); Kyushu Electric Power Co., Ltd., Apr. 1990.

(Continued)

*Primary Examiner* — Ricardo Palabrica
(74) *Attorney, Agent, or Firm* — Westerman, Hattori, Daniels & Adrian, LLP (57) ABSTRACT

A pH adjusting system includes a water pit for refueling 35 that is disposed in a reactor container 10, which stores a reactor, and is capable of storing cooling water and a pH adjusting apparatus 37 that is disposed above the water pit for refueling 35 and houses a pH adjuster. The pH adjusting apparatus 37 causes a pH-adjusted solution generated by dissolving or mixing the pH adjuster to flow out to the water pit for refueling 35 below the pH adjusting apparatus 37. Consequently, even when it is difficult to dispose the pH adjusting apparatus on a floor of the water pit for refueling, it is possible to suitably perform pH adjustment in the reactor container 10.

4 Claims, 9 Drawing Sheets

FOREIGN PATENT DOCUMENTS

| | | |
|---|---|---|
| JP | 1-266809 A | 10/1989 |
| JP | 2-163699 A | 6/1990 |
| JP | 4-194791 A | 7/1992 |
| JP | 6-258479 A | 9/1994 |

OTHER PUBLICATIONS

International Search Report of PCT/JP2008/053536, date of mailing May 13, 2008.

* cited by examiner

PH ADJUSTING SYSTEM AND PH ADJUSTING METHOD

TECHNICAL FIELD

The present invention relates to a pH adjusting system and a pH adjusting method for adjusting pH in a reactor container at abnormal time of a nuclear reactor stored in the reactor container.

BACKGROUND ART

As a nuclear power plant in the past, a nuclear power plant including a pressurized water reactor is known. In this nuclear power plant, a primary cooling system such as the pressurized water reactor or a steam generator is stored in a reactor container (see, for example, Non-Patent Document 1). A spray facility for spraying spray water into the reactor container is provided around the nuclear container on the assumption of an abnormal situation.

Figure 10:
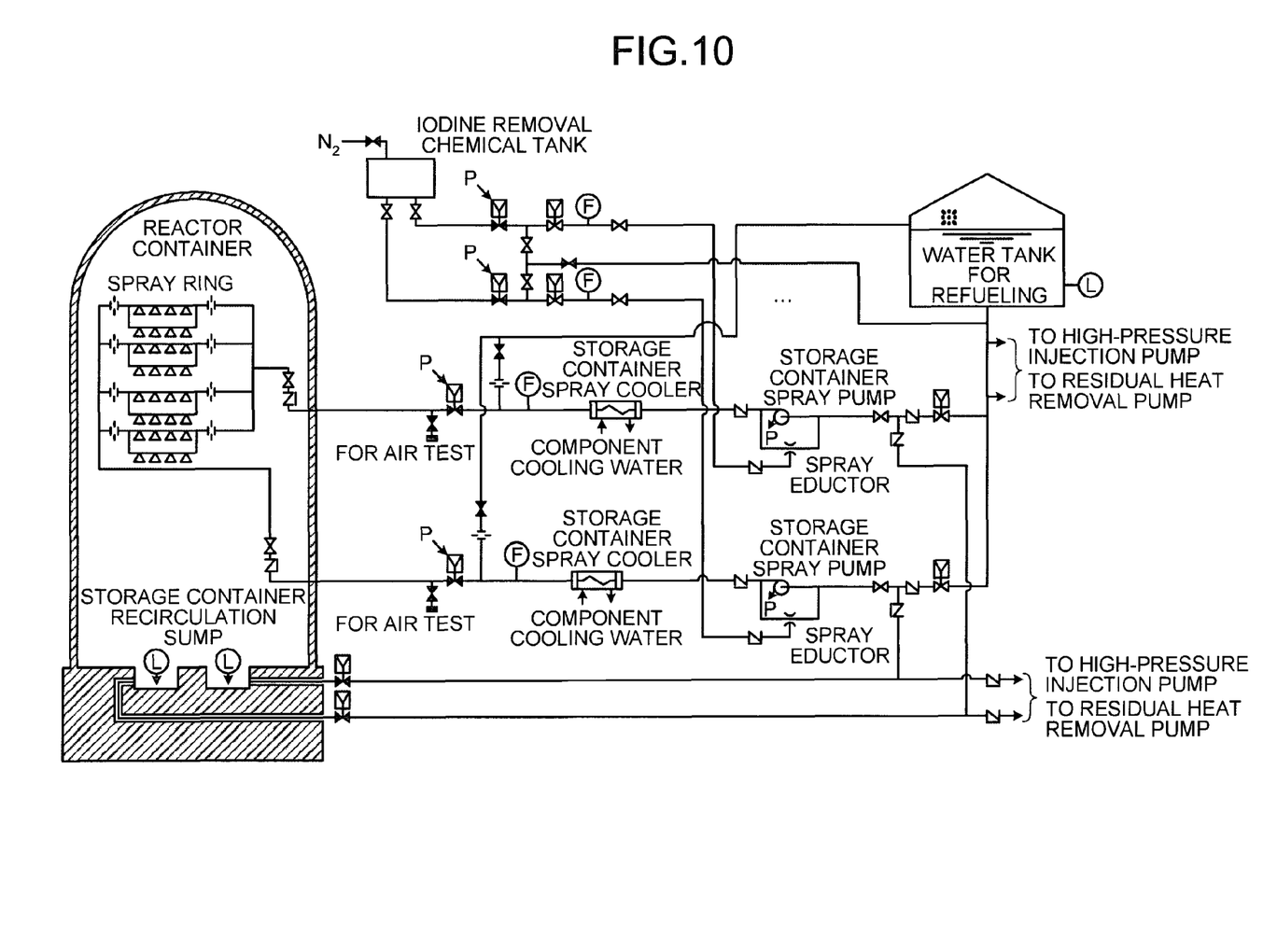
FIG. 10 is a system explanatory diagram of a spray facility in the past.

As shown in FIG. 10, this spray facility includes a water tank for refueling disposed on the outside of the reactor container and serving as a water source, a spray ring disposed in the reactor container, a first spray pipe that connects the water tank for refueling and the spray ring, and a spray pump interposed in the first spray pipe. A storage container recirculation sump that is provided at the bottom of the reactor container and stores the sprayed spray water is provided in this spray facility. The storage container recirculation sump is connected to the first spray pipe between water tank for refueling and the spray pump via a second spray pump.

If an abnormal situation occurs, the pressure in the reactor container is increased by an evaporated primary coolant (light water). In such a case, the spray facility operates, more specifically, the spray pump is driven to spray the spray water from the water tank for refueling into the reactor container via the spray ring, whereby the inside of the reactor container is cooled to reduce the pressure in the reactor container. Thereafter, the sprayed spray water is stored in the storage container recirculation sump and the stored spray water is sprayed from the spray ring again through the second spray pipe. In other words, the spray facility is configured such that the spray water circulates in the reactor container.

In the spray facility, to remove radioactive iodine contained in the evaporated light water, an iodine removal chemical tank that stores an iodine removal chemical, a spray eductor interposed in the first spray pipe, a chemical injection flow path that connects the iodine removal chemical tank and the spray eductor, and an on-off valve interposed in the chemical injection flow path are provided. Consequently, at abnormal time, the on-off valve is opened and the iodine removal chemical is injected into the first spray pipe via the spray eductor to mix the iodine removal chemical and the spray water. The mixture of the iodine removal chemical and the spray water is sprayed into the reactor container to remove the radioactive iodine in the reactor container.

In this case, in general, strong alkali caustic soda is used as the iodine removal chemical. Therefore, to reduce burdens of management and operation of the chemical and a test of a chemical injection line valve, a pH adjusting system described below is also adopted.

For example, it is known that a mesh basket containing a pH adjuster such as trisodium phosphate is arranged on a base level near an outer peripheral wall in the nuclear reactor (on a floor of the storage container recirculation sump) (see, for example Non-Patent Document 2). With this configuration, when the spray water is sprayed by the spray facility at abnormal time, the storage container recirculation sump is filled with the spray water. Then, the basket disposed on the floor of the storage container recirculation sump is submerged and the pH adjuster stored in the basket dissolves in the spray water. Thereafter, the spray water in which the pH adjuster dissolves is circulated in the reactor container by the spray facility. This makes it possible to adjust pH in the reactor container. The radioactive iodine can be kept in the solution by adjusting pH in the reactor container.

The deterioration in durability of structural materials and various devices in the reactor container can be controlled by adjusting pH in the reactor container. Boric acid is dissolved in the light water to decelerate neutrons generated by the nuclear fission reaction. Therefore, the light water is low in pH and acidic. The recirculated water is likely to deteriorate durability of materials of devices and pipes that recirculate the light water for a long period after an accident. However, the deterioration in durability of the devices and the pipes can be controlled by adjusting pH in the reactor container to be neutral.

Non-Patent Document 1: "Genkai Nuclear Power Plant, Application for Permission of a Change in the Nuclear Reactor (A Change in Nos. 3 and 4 Nuclear Reactor Facilities)", Kyushu Electric Power Co., Inc., April 1990, Attached Document 8, p. 8-5-8 to 8-5-10 and p. 8-5-18

Non-Patent Document 2: J. A. Reinhart Site Director/Fort Calhoun Station, "Fort Calhoun Station, Unit No. 1 License Amendment Request (LAR) 'Change of Containment Building Sump Buffering Agent from Trisodium Phosphate to Sodium Tetraborate'", [online], Aug. 21, 2006, U.S.NRC, [retrieved on Oct. 17, 2007], Internet <URL: http://www.nrc.gov/→select Electrpnic Reading Room→select Documents in ADAMS→select Web-based access→select Begin ADAMS Search→Input "ML062340039"→select Rank 5. (80)>

DISCLOSURE OF INVENTION

Problem to be Solved by the Invention

However, in the nuclear power plant, in design, it may be difficult to set the basket on the floor of the storage container recirculation sump. Such difficulty occurs, for example, when boric water is always filled in a water storage tank set at the bottom of the storage container or when a space for arranging the basket on the floor of the storage container recirculation sump cannot be secured.

Therefore, it is an object of the present invention to provide a pH adjusting system and a pH adjusting method that can suitably perform pH adjustment in a reactor container even if it is difficult to dispose a pH adjusting apparatus on a floor of an internal water storage tank.

Means for Solving Problem

According to an aspect of the present invention, a pH adjusting system comprises an internal water storage tank that is disposed in a reactor container, which stores a nuclear reactor, and is capable of storing cooling water; and a pH adjusting apparatus that is disposed above the internal water storage tank and stores a pH adjuster. The pH adjusting apparatus causes a pH-adjusted solution generated by dissolving or mixing the pH adjuster to flow out to the internal water storage tank below the pH adjusting apparatus.

In the pH adjusting system, the pH adjuster may be prepared in a powder state.

The pH adjusting system may further comprise a solvent injecting unit that is capable of injecting a solvent for dissolving or diluting the pH adjuster into the pH adjusting apparatus. The pH adjusting apparatus may dissolve or mix the pH adjuster in the solvent, which is injected by the solvent injecting unit, to generate a pH-adjusted solution and may cause the generated pH-adjusted solution to flow out to the internal water storage tank below the pH adjusting apparatus.

The pH adjusting system may further comprise a spraying unit that is capable of spraying the cooling water stored in the internal water storage tank into an inside of the reactor container. The spraying unit may also function as the solvent injecting unit and the cooling water may be used as the solvent, and the pH adjusting apparatus may be disposed below the spraying unit.

The pH adjusting system may further comprise an external water storage tank that is provided on an outside of the reactor container and is capable of storing the solvent. The solvent injecting unit may inject the solvent, which is stored in the external water storage tank, into the pH adjusting apparatus.

In the pH adjusting system, the solvent injecting unit may inject the cooling water, which is stored in the internal water storage tank, into the pH adjusting apparatus as the solvent.

In the pH adjusting system, the pH adjusting apparatus may include a pH adjuster, a basket containing the pH adjuster, and a basket housing container housing the basket. An inlet through which the solvent injected from the solvent injecting unit flows in, and an outlet from which the pH-adjusted solution generated by dissolving or mixing the pH adjuster in the solvent flows out to the internal water storage tank are formed in the basket housing container.

In the pH adjusting system, the outlet of the basket housing container may include an overflow pipe, and a start edge of the overflow pipe is located at a bottom of the basket housing container.

In the pH adjusting system, a terminal end of the overflow pipe may be connected to the internal water storage tank.

In the pH adjusting system, the pH adjusting apparatus may further include a vent pipe provided in the overflow pipe to vent the overflow pipe.

According to another aspect of the present invention, a pH adjusting system comprises a reactor container that stores a nuclear reactor; an internal water storage tank that is disposed in a reactor container and is capable of storing cooling water; a spraying unit that is capable of spraying the cooling water, which is stored in the internal water storage tank, to an inside of the reactor container at abnormal time; and a pH adjusting apparatus that is disposed above the internal water storage tank and below the spraying unit and stores a pH adjuster therein. The pH adjusting apparatus includes the pH adjuster, a basket containing the pH adjuster, and a basket housing container that houses the basket therein, and is formed therein an inlet through which the cooling water sprayed from the spraying unit flows in and an outlet from which the pH-adjusted solution generated by dissolving the pH adjuster in the cooling water flows out to the internal water storage tank.

According to still another aspect of the present invention, a pH adjusting system comprises a reactor container that stores a nuclear reactor; an internal water storage tank that is disposed in a reactor container and is capable of storing cooling water; a pH adjusting apparatus that is disposed above the internal water storage tank and stores a pH adjuster therein; and a solvent injecting unit that is capable of injecting the cooling water, which is stored in the internal water storage tank, into the pH adjusting apparatus as a solvent for dissolving or diluting the pH adjuster at abnormal time. The pH adjusting apparatus includes the pH adjuster, a basket containing the pH adjuster, and a basket housing container that houses the basket therein. The basket housing container includes an inlet through which the cooling water injected from the solvent injecting unit flows in and an outlet from which the pH-adjusted solution generated by dissolving the pH adjuster in the cooling water flows out to the internal water storage tank.

According to still another aspect of the present invention, a pH adjusting method for adjusting pH in a reactor container at abnormal time of a reactor stored in the reactor container comprises a pH-adjusted-solution generating for injecting a solvent for dissolving or diluting a pH adjuster into a pH adjusting apparatus that stores the pH adjuster therein and dissolving or mixing the pH adjuster in the solvent to generate a pH-adjusted solution; and a mixing for causing the pH-adjusted solution, which is generated at the pH-adjusted-solution generating, to flow into an internal water storage tank that is provided below the pH adjusting apparatus and stores cooling water and mixing the pH-adjusted solution in the cooling water.

The pH adjusting method may further comprises a spraying for spraying the cooling water mixed with the pH-adjusted solution in the mixing into an inside of the reactor container.

Effect of the Invention

With the pH adjusting system according to the present invention, the pH adjusting apparatus can surely cause the pH-adjusted solution generated by dissolving or mixing the pH adjuster to flow into the internal water storage tank below the pH adjusting apparatus. Therefore, it is possible to dispose the pH adjusting apparatus above the internal water storage tank, mix the pH-adjusted solution in the cooling water, and suitably perform pH adjustment in the reactor container. In other words, even if there is no space for disposing the pH adjusting apparatus on the floor of the internal water storage tank, it is possible to dispose the pH adjusting apparatus in an arbitrary position above the internal water storage tank. It is preferable to dispose the pH adjusting apparatus in a free space in the reactor container. This makes it possible to effectively make use of the free space and dispose the pH adjusting apparatus without changing an existing configuration. When the pH adjuster is in a solid state, the pH adjuster is dissolved into the pH-adjusted solution. When the pH adjuster is in a liquid state, the pH adjuster is diluted into the pH-adjusted solution.

With the pH adjusting system according to the present invention, because the pH adjuster can be prepared in a powder state, the pH adjuster can be prepared to be easily dissolved. This makes it possible to efficiently generate a pH-adjusted solution with the pH adjusting apparatus.

With the pH adjusting system according to the present invention, it is possible to inject the solvent into the pH adjusting apparatus by the solvent injecting means. Therefore, it is possible to dissolve or mix the pH adjuster in the solvent to generate a pH-adjusted solution.

With the pH adjusting system according to the present invention, because the cooling water stored in the internal water storage tank is sprayed into the reactor container by the spraying means, it is possible to efficiently cool the inside of the reactor container. Because the sprayed cooling water flows into the internal water storage tank again, it is possible to circulate the cooling water in the reactor container. Moreover, because the spraying means also serves as the solvent injecting means, it is possible to reduce the number of components of the pH adjusting system and simplify a configuration of the pH adjusting system.

With the pH adjusting system according to the present invention, it is possible to provide the external water storage tank and inject the solvent stored in the external water storage tank into the pH adjusting apparatus. Therefore, because it is unnecessary to dispose the pH adjusting apparatus right below the spraying means unlike the pH adjusting apparatus according to the previously mentioned invention, it is possible to improve a degree of freedom of a disposition position of the pH adjusting apparatus.

With the pH adjusting system according to the present invention, it is possible to inject the cooling water stored in the internal water storage tank into the pH adjusting apparatus as the solvent. Therefore, because it is unnecessary to dispose the pH adjusting apparatus right below the spraying means unlike the pH adjusting apparatus according to the previously mentioned invention, it is possible to improve a degree of freedom of a disposition position of the pH adjusting apparatus.

With the pH adjusting system according to the present invention, because the solvent (the cooling water) is caused to flow into the basket housing container by the solvent injecting means (the spraying mean) through the inlet in a state in which the basket containing the pH adjuster is stored in the basket housing container, it is possible to submerge the basket in the solvent. In other words, it is possible to dissolve or mix the pH adjuster in the solvent by submerging the pH adjuster in the solvent. This makes it possible to generate a pH-adjusted solution. The generated pH-adjusted solution can flow into the internal water storage tank through the outlet. Because the generated pH-adjusted solution flows into the internal water storage tank in a free fall, it is unnecessary to use a driving system such as an on-off valve or a pump. In other words, it is possible to supply the pH-adjusted solution to the internal water storage tank simply by injecting the solvent into the basket housing container. Consequently, because a supply failure of the pH-adjusted solution due to an operation failure of the driving system is not caused, it is possible to improve not only reliability of the pH adjusting apparatus and but also reliability of the pH adjusting system. Because the solvent in the basket housing container flows from the inlet to the outlet, compared with a method of simply submerging the basket as in the past, it is possible to efficiently dissolve the pH adjuster. It is preferable to configure the basket using a mesh or the like.

With the pH adjusting system according to the present invention, the outlet includes the overflow pipe and the start end point of the overflow pipe is located at the bottom of the basket housing container. Therefore, it is possible to cause the high-density pH-adjusted solution, which tends to stay at the bottom, to flow out to the internal water storage tank. In other words, the pH-adjusted solution moves further downward as the density is higher. Therefore, by adopting the configuration described above, it is possible to satisfactorily cause the pH-adjusted solution to flow out without causing the high-density pH-adjusted solution to stay at the bottom of the basket housing container.

With the pH adjusting system according to the present invention, because the terminal end of the overflow pipe is connected to the internal water storage tank, it is possible to appropriately lead the pH-adjusted solution to the internal water storage tank.

With the pH adjusting system according to the present invention, the pH adjusting system includes the vent pipe for opening the inside of the duct of the overflow pipe to the atmosphere. Therefore, a siphon effect due to filling of the overflow pipe with the solvent (the cooling water) is not caused.

With the pH adjusting system according to the present invention, because the cooling water is sprayed over the pH adjusting apparatus by the spraying means at abnormal time, it is possible to cause the cooling water to flow into the basket housing container through the inlet. When the cooling water flows into the basket housing container, the basket housing container is filled with the cooling water and the basket is submerged. When the basket is submerged, because the pH adjuster is dissolved in the cooling water, the pH-adjusted solution is generated. The generated pH-adjusted solution flows into the internal water storage tank through the outlet. By configuring the pH adjusting apparatus as described above, it is possible to dispose the pH adjusting apparatus above the internal water storage tank. In other words, even if there is no space for disposing the pH adjusting apparatus on the floor of the internal water storage tank, it is possible to dispose the pH adjusting apparatus in an arbitrary position above the internal water storage tank. Because the generated pH-adjusted solution is caused to flow into the internal water storage tank in a free fall, it is unnecessary to use a driving system such as an on-off valve or a pump. In other words, it is possible to supply the pH-adjusted solution to the internal water storage tank simply by injecting the solvent into the basket housing container. Consequently, because a supply failure of the pH-adjusted solution due to an operation failure of the driving system is not caused, it is possible to improve not only reliability of the pH adjusting apparatus but also reliability of the pH adjusting system.

With the pH adjusting system according to the present invention, the cooling water is injected into the pH adjusting apparatus by the solvent injecting means at abnormal time. Therefore, it is possible to cause the cooling water to flow into the basket housing container through the inlet. When the cooling water flows into the basket housing container, the basket housing container is filled with the cooling water and the basket is submerged. When the basket is submerged, because the pH adjuster is dissolved in the cooling water, the pH-adjusted solution is generated. The generated pH-adjusted solution flows into the internal water storage tank through the outlet. It is possible to dispose the pH adjusting apparatus above the internal water storage tank by configuring the pH adjusting apparatus as described above. In other words, even if there is no space for disposing the pH adjusting apparatus on the floor of the internal water storage tank, it is possible to dispose the pH adjusting apparatus in an arbitrary position above the internal water storage tank.

With the pH adjusting method according to the present invention, it is possible to dispose the pH adjusting apparatus above the internal water storage tank provided in the reactor container and suitably perform adjustment of pH in the reactor container.

With the pH adjusting method according to the present invention, it is possible to spray the cooling water mixed with the pH-adjusted solution into the reactor container. This makes it possible to satisfactorily perform pH adjustment in the reactor container.

EXPLANATIONS OF LETTERS OR NUMERALS 1 nuclear power plant
5 nuclear reactor
10 reactor container
30 pH adjusting system
35 water pit for refueling
36 spray facility
37 pH adjusting apparatus
42 inspection rack
45 spray ring
46 spray pump
50 basket
51 basket housing container
52 overflow pipe
53 vent pipe
201 pH adjusting system (second embodiment)
205 water tank for refueling
301 pH adjusting system (third embodiment)
305 water filling facility
307 injection nozzle
308 water filling pipe
309 ECCS pump
401 water filling pump

BEST MODE(S) FOR CARRYING OUT THE INVENTION

A nuclear power plant to which a pH adjusting system according to the present invention is applied is explained below referring to the attached drawings. The present invention is not limited by embodiments described below.

First Embodiment

In a nuclear power plant according to this embodiment, a pressurized water reactor (PWR) is used as a nuclear reactor. In a pressurized water nuclear power plant, after light water as a primary coolant is heated in the nuclear reactor, the high-temperature light water is sent to a steam generator by a pump. In the nuclear power plant, the high-temperature light water is subjected to heat exchange with a secondary coolant to evaporate the secondary coolant. The evaporated secondary coolant (steam) is sent to a turbine to drive a generator, whereby power generation is performed.

Figure 1:
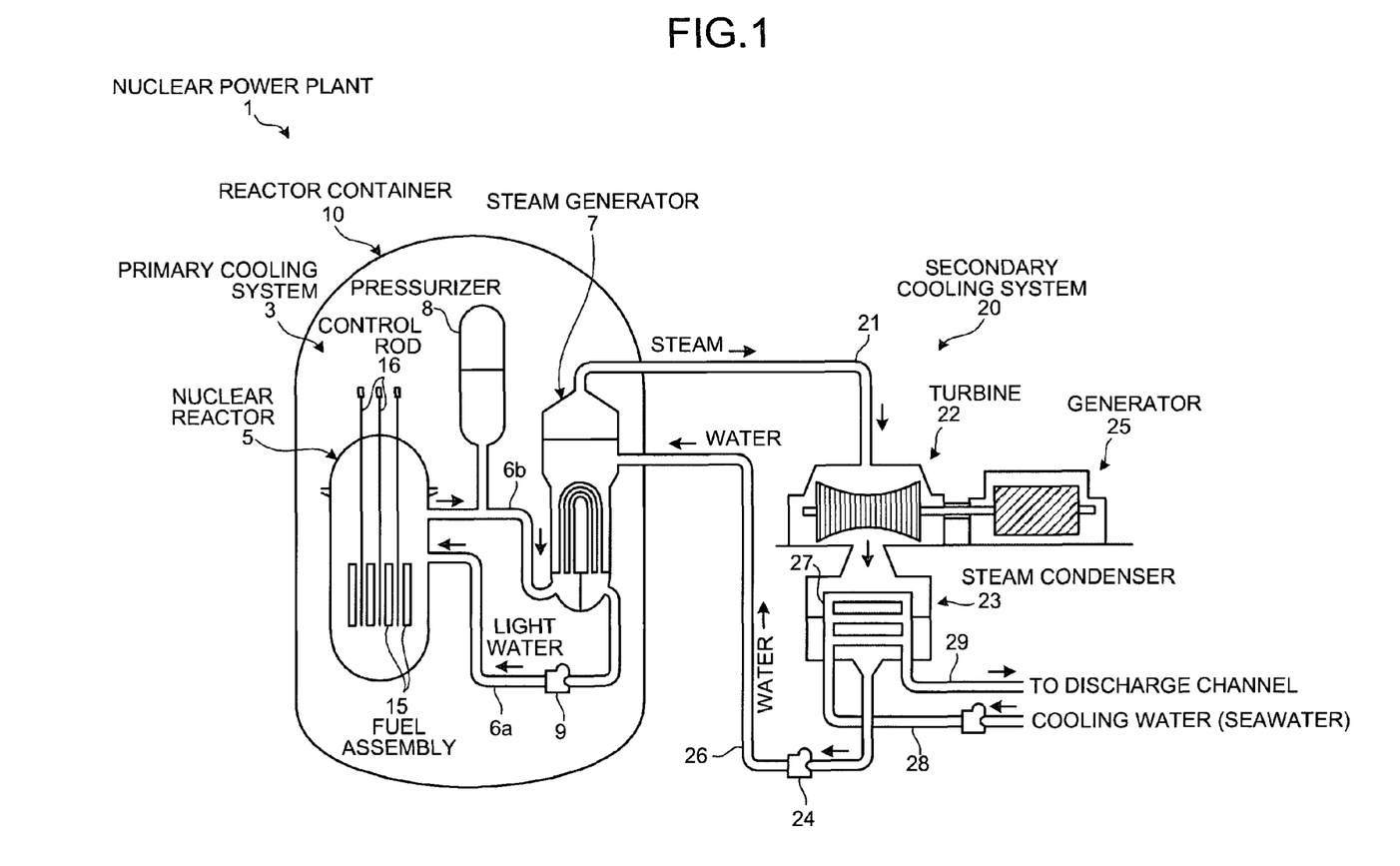
FIG. 1 is a schematic diagram of a nuclear power plant according to a first embodiment.
Figure 2:
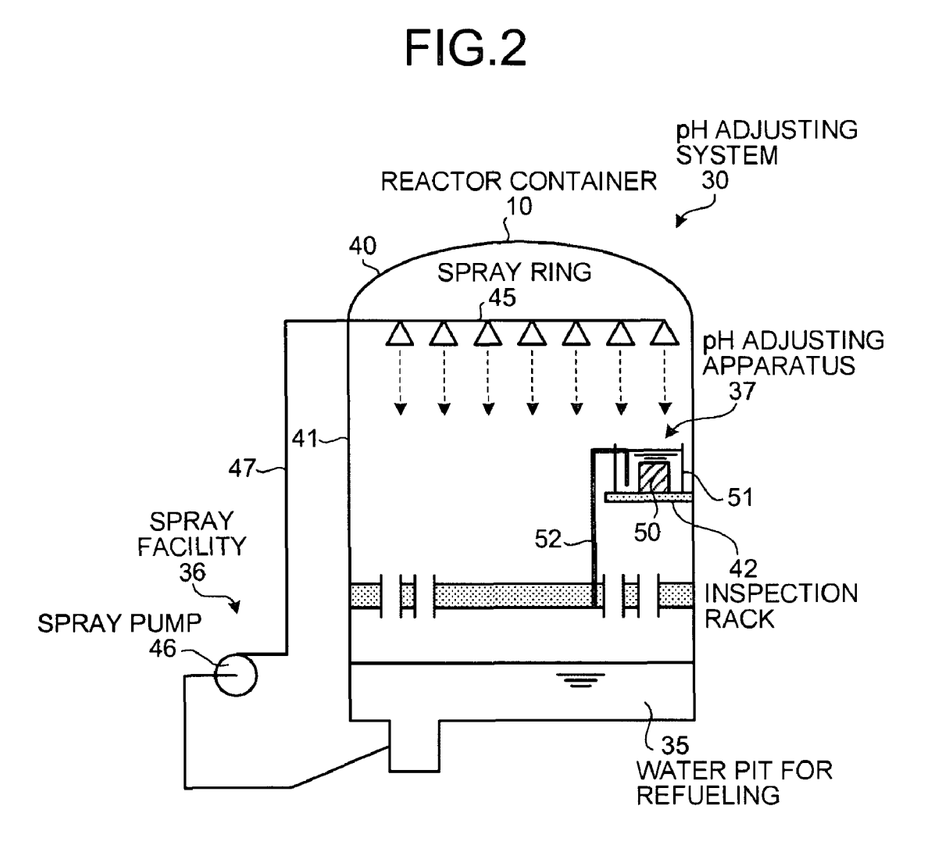
FIG. 2 is a schematic diagram of a pH adjusting system according to the first embodiment.
Figure 3:
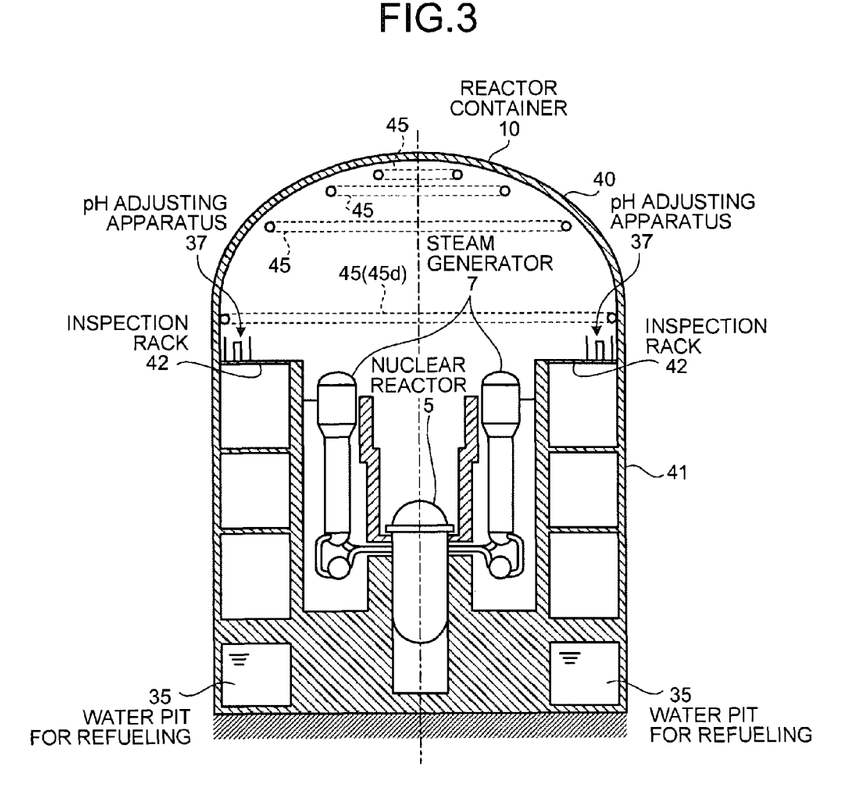
FIG. 3 is a side sectional view of a reactor container.
Figure 4:
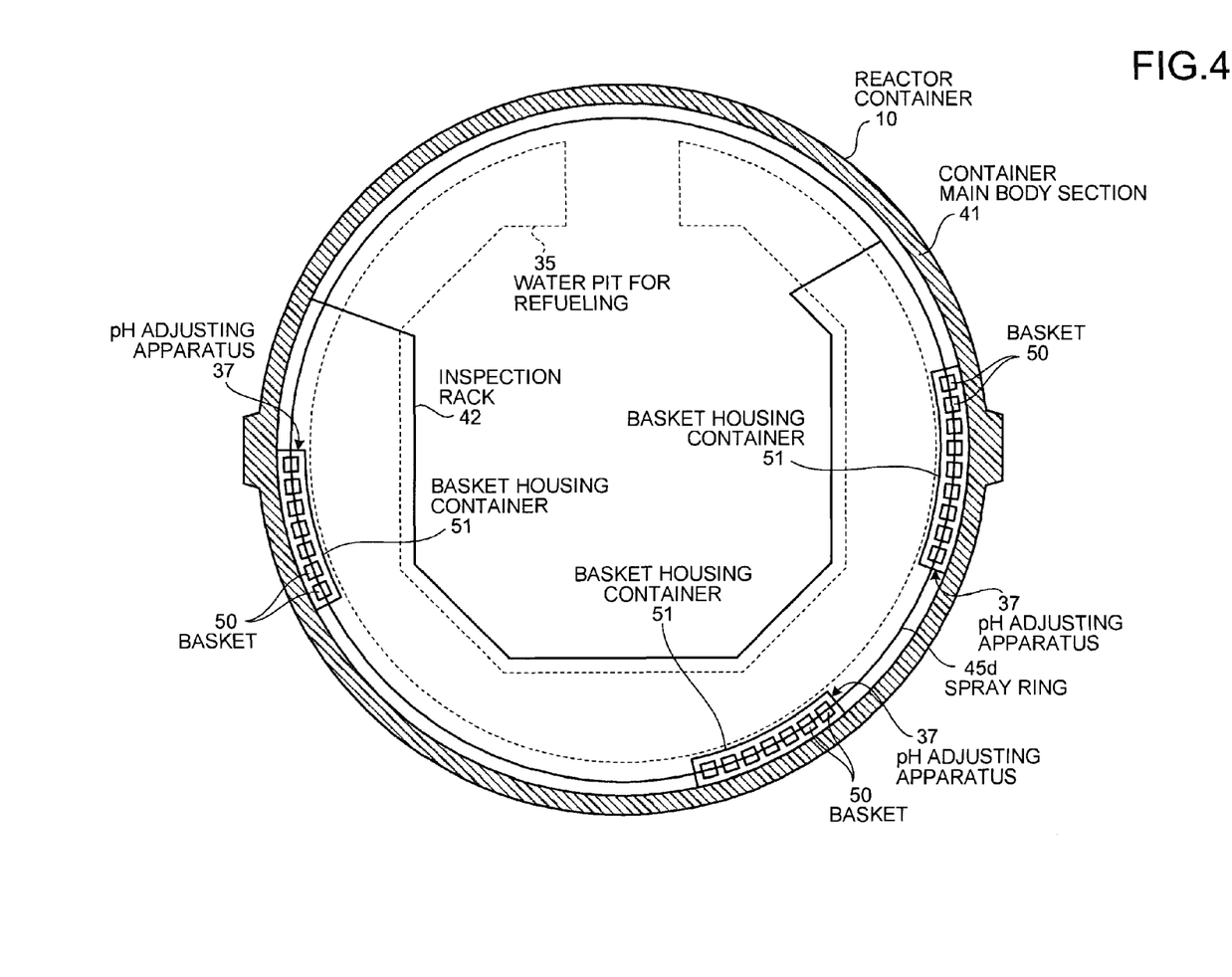
FIG. 4 is a plan sectional view of the reactor container.

FIG. 1 is a schematic diagram of the nuclear power plant according to this embodiment. FIG. 2 is a schematic diagram of a pH adjusting system according to this embodiment. FIG. 3 is a side sectional view of a reactor container. FIG. 4 is a plan sectional view of the reactor container. A configuration of the nuclear power plant is explained referring to FIG. 1.

As shown in FIG. 1, the nuclear power plant 1 has a nuclear reactor 5 and a steam generator 7 connected to the nuclear reactor 5 via a pair of coolant pipes 6a and 6b made of a cold leg 6a and a hot leg 6b. A pressurizer 8 is interposed in the hot leg 6b of the pair of coolant pipes 6a and 6b. A coolant pump 9 is interposed in the cold leg 6a. A primary cooling system 3 of the nuclear power plant 1 includes the nuclear reactor 5, the pair of coolant pipes 6a and 6b, the steam generator 7, the pressurizer 8, and the coolant pump 9, which are housed in a reactor container 10.

In the configuration described above, the light water as the primary coolant flows into the steam generator 7 from the nuclear reactor 5 through the hot leg 6b. Thereafter, the light water flowing out through the steam generator 7 flows into the nuclear reactor 5 through the cold leg 6a. In other words, the light water is circulating between the nuclear reactor 5 and the steam generator 7. Boric acid is dissolved in the light water to decelerate neutrons generated by the nuclear fission reaction of the nuclear reactor 5. The light water is acidic. In other words, the light water is used as a coolant and a neutron decelerator.

The nuclear reactor 5 is the pressurized water reactor as described above. The inside of the nuclear reactor 5 is filled with the light water. In the nuclear reactor 5, a large number of fuel assemblies 15 are housed and a large number of control rods 16 that controls atomic fission of the fuel assemblies 15 are provided to be insertable in the fuel assemblies 15.

When the fuel assemblies 15 are subjected to atomic fission while the atomic fission reaction is controlled by the control rods 16, thermal energy is generated by this atomic fission. The generated thermal energy heats the light water and the heated light water is sent to the steam generator 7 via the hot leg 6b. On the other hand, the light water sent from the steam generator 7 via the cold leg 6a flows into the nuclear reactor 5 and cools the inside of the nuclear reactor 5.

The pressurizer 8 interposed in the hot leg 6 pressurizes the high-temperature light water to thereby control boiling of the light water. The steam generator 7 subjects the high-temperature light water to heat exchange with the secondary coolant to thereby evaporate the secondary coolant to generate steam and cool the high-temperature and high-pressure light water. The coolant pump 9 circulates the light water in the primary cooling system 3, sends the light water into the nuclear reactor 5 from the steam generator 7 via the cold leg 6a, and sends the light water into the steam generator 7 from the nuclear reactor 5 via the hot leg 6b.

A series of operations in the primary cooling system 3 of the nuclear power plant 1 are explained. When the light water is heated by the thermal energy generated by the atomic fission reaction in the nuclear reactor 5, the heated light water is sent to the steam generator 7 by the coolant pump 9 via the hot leg 6b. The high-temperature light water passing through the hot leg 6b is pressurized by the pressurizer 8 and boiling thereof is controlled. The light water flows into the steam generator 7 in a high-temperature and high-pressure state. The high-temperature and high-pressure light water flowing into the steam generator 7 is cooled by being subjected to heat exchange with the secondary coolant. The cooled light water is sent to the nuclear reactor 5 by the coolant pump 9 via the cold leg 6a. When the cooled light water flows into the nuclear reactor 5, the nuclear reactor 5 is cooled.

The nuclear power plant 1 has a turbine 22 connected to the steam generator 7 via a steam pipe 21, a steam condenser 23 connected to the turbine 22, and a feed water pump 24 interposed in a condensing and feeding pipe 26 that connects the steam condenser 23 and the steam generator 7. A secondary cooling system 20 includes these units. A secondary coolant circulating through the secondary cooling system 20 evaporates in the steam generator 7 to be gas (steam) and is changed from the gas to liquid in the steam condenser 23. A generator 25 is connected to the turbine 22.

When the steam flows into the turbine 22 from the steam generator 7 via the steam pipe 21, the turbine 22 rotates. When the turbine 22 rotates, the generator 25 connected to the turbine 22 performs heat generation. Thereafter, the steam flowing out from the turbine 22 flows into the steam condenser 23. Cooling pipes 27 are disposed in the steam condenser 23. An intake pipe 28 for supplying cooling water (e.g., seawater) is connected to one of the cooling pipes 27. A drainage pipe 29 for draining the cooling water is connected to the other of the cooling pipes 27. The steam condenser 23 cools the steam, which flows in from the turbine 22, with the cooling pipe 27 to change the steam to liquid. The secondary coolant changed to the liquid is sent to the steam generator 7 by the feed water pump 24 via the condensing and feeding pipe 26. The secondary coolant sent to the steam generator 7 is subjected to heat exchange with the primary coolant to be changed to the steam again in the steam generator 7.

In the nuclear power plant 1, a pH adjusting system 30 for cooling the inside of the reactor container 10 and controlling evaporation of radioactive iodine and a fall in durability of structural materials and the like is incorporated. The pH adjusting system 30 in this embodiment is explained below referring to FIGS. 2 to 5.

This pH adjusting system 30 is a system for cooling the inside of the reactor container 10 and controlling evaporation of radioactive iodine and a fall in durability of structural materials and the like at abnormal time. As shown in FIGS. 2 and 3, the pH adjusting system 30 includes the reactor container 10 described above, a water pit for refueling 35 (an internal water storage tank) provided at the bottom in the reactor container 10, a spray facility 36 (solvent injecting means and spraying means) that can spray boric water (cooling water and the solvent) stored in the water pit for refueling 35 in the reactor container 10, and three pH adjusting apparatuses 37 for adjusting pH in the reactor container 10.

As shown in FIG. 3, the reactor container 10 integrally includes a container sealing section 40 formed in a hollow semispherical shape and a container main body section 41 formed in a bottomed cylindrical shape. The nuclear reactor 5, the pair of coolant pipes 6a and 6b, the steam generator 7, the pressurizer 8, and the coolant pump 9 are stored in the reactor container 10. The nuclear reactor 5 is disposed in the center of the reactor container 10. For example, two steam generators 7 are disposed to be adjacent to each other on both sides of the nuclear reactor 5. An inspection rack 42 formed in a horseshoe shape in plan view is disposed in an upper part of a container main body section 41 of the reactor container 10 along an inner wall thereof (see FIG. 4). The inspection rack 42 includes a grating or the like. The three pH adjusting apparatuses 37 are disposed on this inspection rack 42. The inside of the reactor container 10 is configured such that boric acid water sprayed from a spray ring 45 described later returns to the water pit for refueling 35.

The water pit for refueling 35 is disposed at the bottom of the reactor container 10 and is disposed in a horseshoe shape in plan view in a peripheral direction along an inner wall of the reactor container 10 (see FIG. 4). The inside of the water pit for refueling 35 is always filled with boric acid water. Usually, this boric acid water is used for refueling the fuel assemblies 15. However, at abnormal time of the reactor 5, this boric acid water is also used as cooling water for cooling the inside of the reactor container 10. This boric acid water is also used as a solvent of a pH adjuster described later. The water pit for refueling 35 is not limited to the configuration described above. A plurality of water pits for refueling can be disposed at equal intervals in the peripheral direction along the inner wall of the reactor container 10.

As shown in FIG. 2, the spray facility 36 includes four spray rings 45 (see FIG. 3) provided in a container ceiling section 40 in the reactor container 10, a spray pipe 47 that connects the four spray rings 45 and the water pit for refueling 35, and a spray pump 46 interposed in the spray pipe 47.

As shown in FIG. 3, the respective spray rings 45 are formed in ring shapes having different diameters. The four spray rings 45 are disposed in parallel to a center axis direction in a state in which the centers thereof are aligned and are disposed such that the diameters increase from a ceiling side to a bottom side. The diameter of the spray ring 45 located at the top of the container ceiling section 40 is the smallest and the diameter of a spray ring 45d located at the bottom is the largest. The spray pump 46 pumps up the boric acid water stored in the water pit for refueling 35 and supplies the boric acid water to the four spray rings 45.

As shown in FIG. 4, the three pH adjusting apparatuses 37 are disposed in arbitrary positions of the inspection rack 42, respectively. The pH adjusting apparatuses 37 are attached to an inner wall of the container main body section 41 and disposed at intervals in a peripheral direction of the container main body section 41. In other words, the three pH adjusting apparatuses 37 are disposed above the water pit for refueling 35 and disposed right below the spray ring 45d at the bottom (see FIG. 3). Consequently, the respective pH adjusting apparatuses 37 are disposed in water spray positions of water spray nozzles of the spray ring 45d at the bottom.

Figure 5:
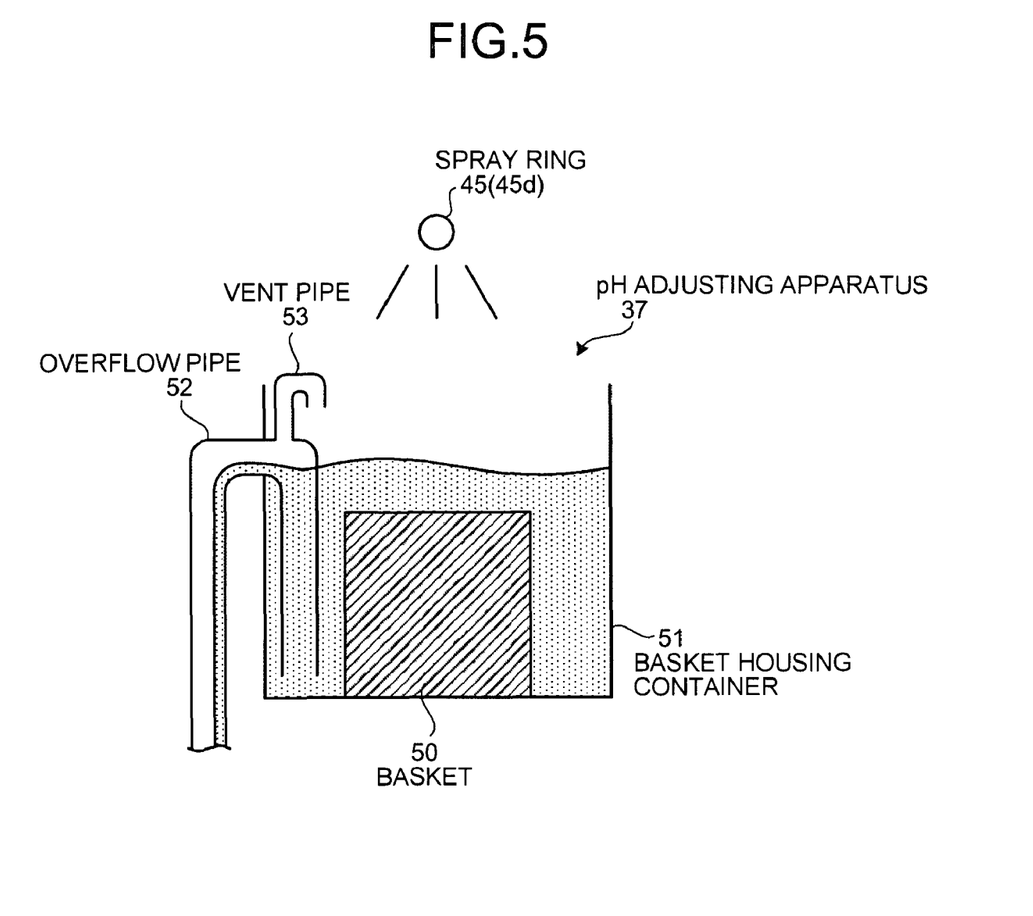
FIG. 5 is a schematic diagram of a pH adjusting apparatus according to the first embodiment.

As shown in FIG. 5, each of the pH adjusting apparatuses 37 has a pH adjuster, a plurality of baskets 50 (one is shown in FIG. 5) that include the pH adjuster, a basket housing container 51 that houses the basket 50, an overflow pipe 52 provided in the basket housing container 51, and a vent pipe 53 provided in the overflow pipe 52. The number of baskets 50 housed in the basket housing container 51 is different for each of the three pH adjusting apparatuses 37. Prepared twenty-three baskets 50 in total are housed by being divided in such a manner that seven baskets, seven baskets, and nine baskets are housed in basket housing containers 51 of the respective pH adjusting apparatuses 37 (see FIG. 4).

As the pH adjuster, for example, sodium tetraborate decahydrate (NaTB) is used. The pH adjuster is formed in a powder state to be easily dissolved in the boric acid water. In this embodiment, NaTB is used as the pH adjuster. However, the pH adjuster is not limited to this. Trisodium phosphate (TSP) and the like can be used.

Each of the baskets 50 containing the pH adjuster is formed in a rectangular parallelepiped shape. A part of the basket 50 (e.g., upper and lower surfaces or sides) is formed by using a mesh. Consequently, because the boric acid water penetrates into the inside of the basket 50, it is possible to make it easy to dissolve the pH adjuster. The pH adjuster in the powder state does not flow out to the outside of the basket 50.

The basket housing container 51 is formed in a box shape opened in an upper surface and is formed to be vent along the inner wall of the container main body section 41. A plurality of baskets 50 are housed in the basket housing container 51. When the boric acid water is sprayed from the spray ring 45d located right above over the basket housing container 51, the sprayed boric acid water is stored in the basket housing container 51 via openings of upper surfaces of the baskets 50 and submerges the baskets 50 housed therein. In other words, the openings of the upper surfaces of the baskets 50 are inlets of the boric acid water.

An outlet of the basket housing container 51 includes the overflow pipe 52. The overflow pipe 52 is formed in a substantially reverse "U" shape. In other words, a start end of the overflow pipe 52 is located at the bottom in the basket housing container 51, the overflow pipe 52 extends upward from the start end along an inner wall of the basket housing container 51, bends in the horizontal direction in a sidewall upper part of the basket housing container 51, and pierces through the sidewall upper part. The overflow pipe 52, which pierces through the sidewall upper part, extends downward along an outer wall of the basket housing container 51, and a terminal end of the overflow pipe 52 is connected to the water pit for refueling 35. An aperture of the overflow pipe 52 is set to an aperture for preventing a duct of the overflow pipe 52 from being filled with the boric acid water, whereby occurrence of the siphon effect is controlled. In this case, it is preferable to dispose overflow pipes 52 in a number same as the number of baskets 50 housed in the basket housing container 51. It is preferable that terminal ends of a plurality of overflow pipes 52 are disposed at intervals in a peripheral direction of the reactor container 10 with respect to the water pit for refueling 35 provided in the peripheral direction. This makes it possible to cause the pH-adjusted solution to evenly flow into the water pit for refueling 35. Therefore, it is possible to quickly and equally perform pH adjustment.

The vent pipe 53 is formed in a substantially reverse "J" shape and disposed above the overflow pipe 52. The vent pipe 53 connects the inside and the outside of the overflow pipe 52. The vent pipe 53 opens the inside of the duct of the overflow pipe 52 to the atmosphere to prevent the inside of the duct of the overflow pipe 52 from being filled with the boric acid water. Consequently, the siphon effect due to the filling of the overflow pipe 52 with the boric acid water is not caused. In other words, because the boric acid water sprayed from the spray ring 45d passes through the basket 50 and flows out from the overflow pipe 52, the pH adjuster in the basket 50 is always exposed to the flowing boric acid water. It is also possible that the vent pipe 53 is not provided, an aperture of the overflow pipe 52 is set to an aperture with which the siphon effect is caused, and a strong flow of the boric acid water due to the siphon effect is repeatedly given to the pH adjuster in the basket 50 to facilitate the dissolution of the pH adjuster.

A series of operations in the pH adjusting system 30 are explained. When an abnormal situation occurs, first, the spray facility 36 operates. In other words, the spray pump 46 is driven to pump up the boric acid water from the water pit for refueling 35 and spray the pumped-up boric acid water into the reactor container 10 via the four spray rings 45. At this point, a part of the boric acid water sprayed from the spray ring 45d located at the bottom flows into the pH adjusting apparatus 37. The other parts of the boric acid water cool the inside of the reactor container 10.

When the boric acid water is sprayed over the pH adjusting apparatus 37, the boric acid water flows into the basket housing container 51. Then, the basket housing container 51 is filled with the boric acid water and the basket 50 is submerged. When the basket 50 is submerged, because the pH adjuster is dissolved in the boric acid water, the pH-adjusted solution is generated (a pH-adjusted-solution generating).

The generated pH-adjusted solution flows into the water pit for refueling 35 in a free fall via the overflow pipe 52. In other words, it is possible to cause the generated pH-adjusted solution to flow into the water pit for refueling 35 without using a driving system such as an on-off valve or a pump. Therefore, a supply failure of the pH-adjusted solution due to a failure of the driving system is not caused. Consequently, it is possible to improve not only reliability of the pH adjusting apparatus 37 but also reliability of the pH adjusting system 30. Because the start end of the overflow pipe 52 is located at the bottom of the basket housing container 51, it is possible to appropriately lead the high-density pH-adjusted solution, which tends to stay at the bottom, to the overflow pipe 52. Moreover, because the terminal end of the overflow pipe 52 is connected to the water pit for refueling 35, it is possible to appropriately lead the pH-adjusted solution, which flows through the overflow pipe 52, to the water pit for refueling 35.

The pH-adjusted solution, which flows into the water pit for refueling 35, is mixed with the boric acid water in the water pit for refueling 35 (a mixing step). Thereafter, the boric acid water mixed with the pH-adjusted solution in the water pit for refueling 35 is pumped up the by spray pump 46 and the pumped-up boric acid water is sprayed into the reactor container 10 via the four spray rings 45 (a spraying step). Consequently, because the pH-adjusted solution circulates in the reactor container 10, pH in the reactor container 10 is adjusted and the inside of the reactor container 10 is cooled.

With the configuration described above, the pH adjusting apparatus 37 can be configured to be capable of generating the pH-adjusted solution at abnormal time and cause the generated pH-adjusted solution to flow into the water pit for refueling 35 below the pH adjusting apparatus 37. Consequently, it is possible to dispose the pH adjusting apparatus 37 above the water pit for refueling 35. In other words, even if there is no space for disposing the pH adjusting apparatus 37 on the floor of the water pit for refueling 35, it is possible to dispose the pH adjusting apparatus 37 in an arbitrary position above the water pit for refueling 35. It is possible to effectively make use of a free space by disposing the pH adjusting apparatus 37 on the inspection rack 42.

The boric acid water sprayed by the spray facility 36 falls on the pH adjusting apparatus 37. In other words, the spray facility 36 simultaneously performs spraying of the boric acid water into the reactor container and injection of the boric acid water into the pH adjusting apparatus. Therefore, it is unnecessary to provide a new solvent injection system that injects the boric acid water into the pH adjusting apparatus 37. Consequently, it is possible to simplify the configuration of the pH adjusting system 30 without increasing the number of components.

Moreover, because the pH adjusting apparatus 37 is configured without using a driving system, a supply failure of the pH-adjusted solution due to an operation failure of the driving system does not occur. Consequently, it is possible to improve not only reliability of the pH adjusting apparatus 37 but also reliability of the pH adjusting system 30.

Although not shown in the figure, for example, a water collecting member formed in a funnel shape can be interposed between the spray ring 45d located at the bottom and the pH adjusting apparatus 37. With this configuration, because the boric acid water sprayed from the spray ring 45d can be effectively collected, it is possible to increase a flow rate of the boric acid water that flows into the pH adjusting apparatus 37. Consequently, it is possible to efficiently perform generation of the pH-adjusted solution by the pH adjusting apparatus 37.

Second Embodiment

Figure 6:
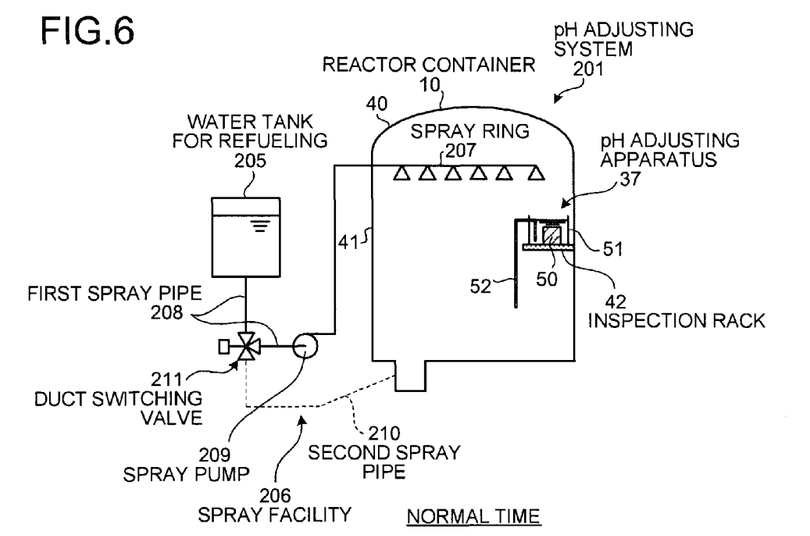
FIG. 6 is a schematic diagram of a pH adjusting system at normal time according to a second embodiment.
Figure 7:
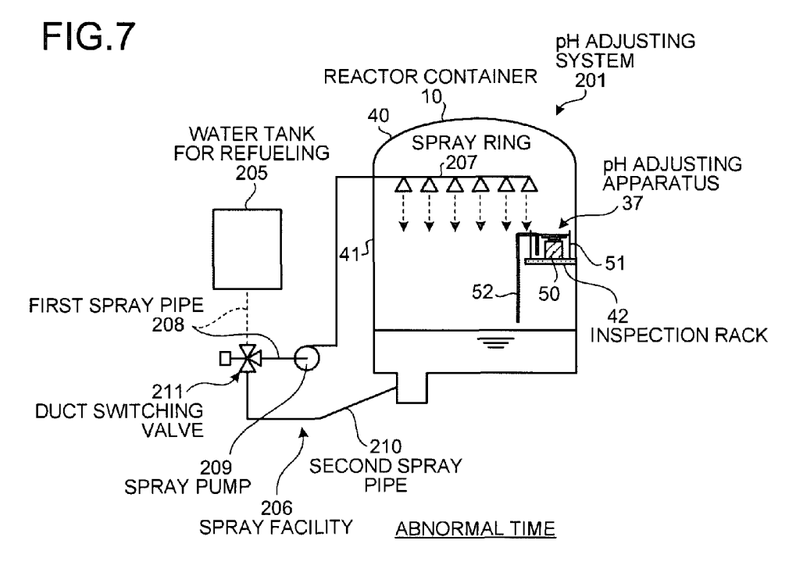
FIG. 7 is a schematic diagram of the pH adjusting system at abnormal time according to the second embodiment.

The nuclear power plant 1 to which the pH adjusting system 201 according to a second embodiment is applied is explained referring to FIGS. 6 and 7. To avoid a redundant description, only sections different from those described above are explained. FIG. 6 is a schematic diagram of a pH adjusting system at normal time according to the second embodiment. FIG. 7 is a schematic diagram of the pH adjusting system at abnormal time according to the second embodiment. In the first embodiment, the water pit for refueling 35 is provided at the bottom of the reactor container 10 and the boric acid water is always filled in the reactor container 10. However, in the second embodiment, the water pit for refueling 35 is not provided at the bottom of the reactor container 10. Instead of the water pit for refueling 35, a water tank for refueling 205 is provided on the outside of the reactor container 10. The pH adjusting system 201 according to the second embodiment is specifically explained below.

This pH adjusting system 201 includes the reactor container 10 that stores the nuclear reactor 5, the water tank 205 provided on the outside of the reactor container 10, a spray facility 206 that can spray boric acid water stored in the water tank for refueling 205 into the reactor container 10, and the pH adjusting apparatus 37 for adjusting pH in the reactor container 10.

The reactor container 10 is configured to be capable of storing the boric acid water at the bottom thereof. Usually, the bottom of the reactor container 10 is in an empty state (see FIG. 6). However, at abnormal time of the nuclear reactor 5, the bottom of the reactor container 10 is filled with the boric acid water sprayed by the spray facility 206 (see FIG. 7). Therefore, the bottom of the reactor container 10 functions as an internal water storage tank that stores the boric acid water at abnormal time.

The water tank for refueling 205 stores the boric acid water in the inside thereof. Usually, the boric acid water is used in refueling the fuel assemblies 15. However, at abnormal time of the nuclear reactor 5, the boric acid water is also used as cooling water for cooling the inside of the reactor container 10.

The spray facility 206 includes four spray rings 207 (one is shown in the figure), a first spray pipe 208 that connects the four spray rings 207 and the water tank for refueling 205, a spray pump 209 interposed in the first spray pipe 208 on the outside of the reactor container 10, a second spray pipe 210 that connects the first spray pipe 208 between the water tank for refueling 205 and the spray pump 209 and the bottom of the reactor container 10, and a duct switching valve 211 disposed in a connecting portion of the first spray pipe 208 and the second spray pipe 210.

When the spray facility 206 operates at abnormal time, first, the spray pump 209 is driven to supply the boric acid water from the water tank for refueling 205 to the spray rings 207. At this point, the duct switching valve 211 switches a duct to lead from the water tank for refueling 205 to the spray rings 207. When the boric acid water is sprayed into the reactor container 10 from the spray ring 207, the sprayed boric acid water flows to the bottom of the reactor container 10. Consequently, the bottom of the reactor container 10 is gradually filled with the boric acid water and a water level thereof rises. When the water level in the water tank for refueling 205 reaches a level equal to or lower than a predetermined water level, the duct switching valve 211 switches the duct to lead from the bottom of the reactor container 10 to the spray rings 207. Then, the spray pump 209 supplies the boric acid water stored at the bottom of the reactor container 10 to the spray rings 207 and circulates the boric acid water in the reactor container 10.

The pH adjusting apparatus 37 is configured in the same manner as the pH adjusting apparatus 37 according to the first embodiment and disposed on the inspection rack 42 provided in the reactor container 10. In other words, the pH adjusting apparatus 37 is disposed right below the spray ring 207 and disposed above the bottom of the reactor container 10 that functions as an internal water storage tank.

When the spray facility 206 operates at abnormal time, the boric aid water is sprayed from the spray rings 207 and the sprayed boric acid water falls on the pH adjusting apparatus 37. When the boric acid water is sprayed on the pH adjusting apparatus 37, the boric acid water flows into the basket housing container 51 and the basket 50 is submerged in the boric acid water. The pH-adjusted solution is generated by the pH adjusting apparatus 37 and the generated pH-adjusted solution flows into the bottom of the reactor container 10.

Consequently, even when there is no space for disposing the pH adjusting apparatus 37 at the bottom of the reactor container 10, by adopting the above configuration, it is possible to dispose the pH adjusting apparatus 37 above a water level of the boric acid water filled at the bottom of the reactor container 10 while suitably performing adjustment of pH in the reactor container 10.

In the embodiment described above, the pH adjusting apparatus 37 includes the pH adjuster, the basket 50, the basket housing container 51, and the like. However, the present invention is not limited to this. The pH adjusting apparatus 37 only has to be configured to dissolve the pH adjuster stored therein with the boric acid water to generate a pH-adjusted solution and cause the generated pH-adjusted solution to flow into the water pit for refueling 35 (the bottom of the reactor container).

Third Embodiment

Figure 8:
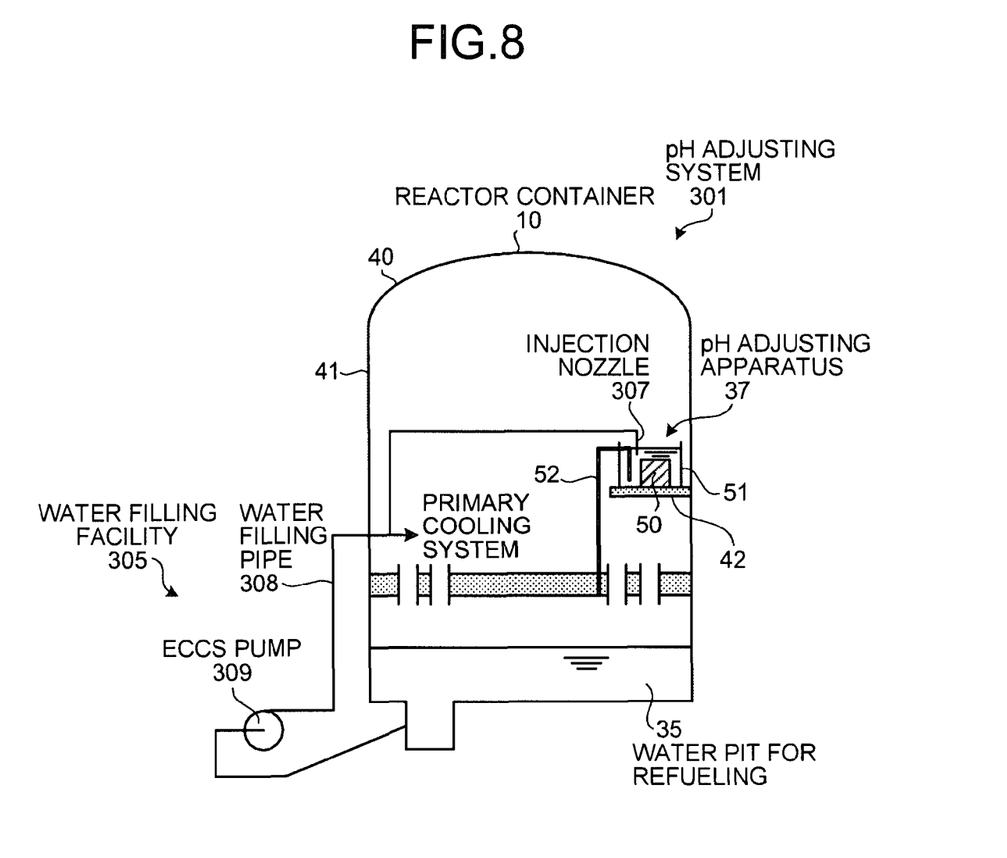
FIG. 8 is a schematic diagram of a pH adjusting system according to a third embodiment.

The nuclear power plant 1 to which a pH adjusting system 301 according to a third embodiment is applied is explained referring to FIG. 8. In this case, as in the above case, to avoid a redundant description, only sections different from those explained above are explained. FIG. 8 is a schematic diagram of a pH adjusting system according to the third embodiment. In the first embodiment, injection of the boric acid water into the pH adjusting apparatus 37 is performed by the spray facility 36. However, in the third embodiment, injection of the boric acid water into the pH adjusting apparatus 37 is performed by a water filling facility 305 (solvent injecting means) instead of the spray facility 36.

The pH adjusting system 301 according to the third embodiment includes the water filling facility 305 that injects the boric acid water into the pH adjusting apparatus 37. The water filling facility 305 has an injection nozzle 307 for injecting the boric acid water into the pH adjusting apparatus 37, a water filling pipe 308 that connects the injection nozzle 307 and the water pit for refueling 35, and an ECCS pump 309 interposed in the water filling pipe 308. The ECCS pump 309 is used in a reactor core system for emergency and supplies the boric acid water to the primary cooling system 3.

When an abnormal situation occurs and the water filling facility 305 operates, the ECCS pump 309 is driven to pump up the boric acid water from the water pit for refueling 35 and inject the pumped-up boric acid water into the pH adjusting apparatus 37 via the injection nozzle 307. When the boric acid water is injected into the pH adjusting apparatus 37, because the basket 50 is submerged in the boric acid water, the pH-adjusted solution is generated. The generated pH-adjusted solution flows into the water pit for refueling 35.

In the configuration described above, as in the first embodiment, the pH adjusting apparatus 37 can be configured to be capable of generating the pH-adjusted solution at abnormal time and cause the generated pH-adjusted solution to flow into the water pit for refueling 35 below the pH adjusting apparatus 37. Consequently, it is possible to dispose the pH adjusting apparatus 37 above the water pit for refueling 35. Unlike the first embodiment, it is unnecessary to dispose the pH adjusting apparatus 37 right below the spray ring 45d. Therefore, the pH adjusting apparatus 37 can be disposed in an arbitrary position without being restricted by a disposition position of the spray ring 45d. In this case, an upper part of the basket housing container 51 can be opened or can be closed by a lid.

Figure 9:
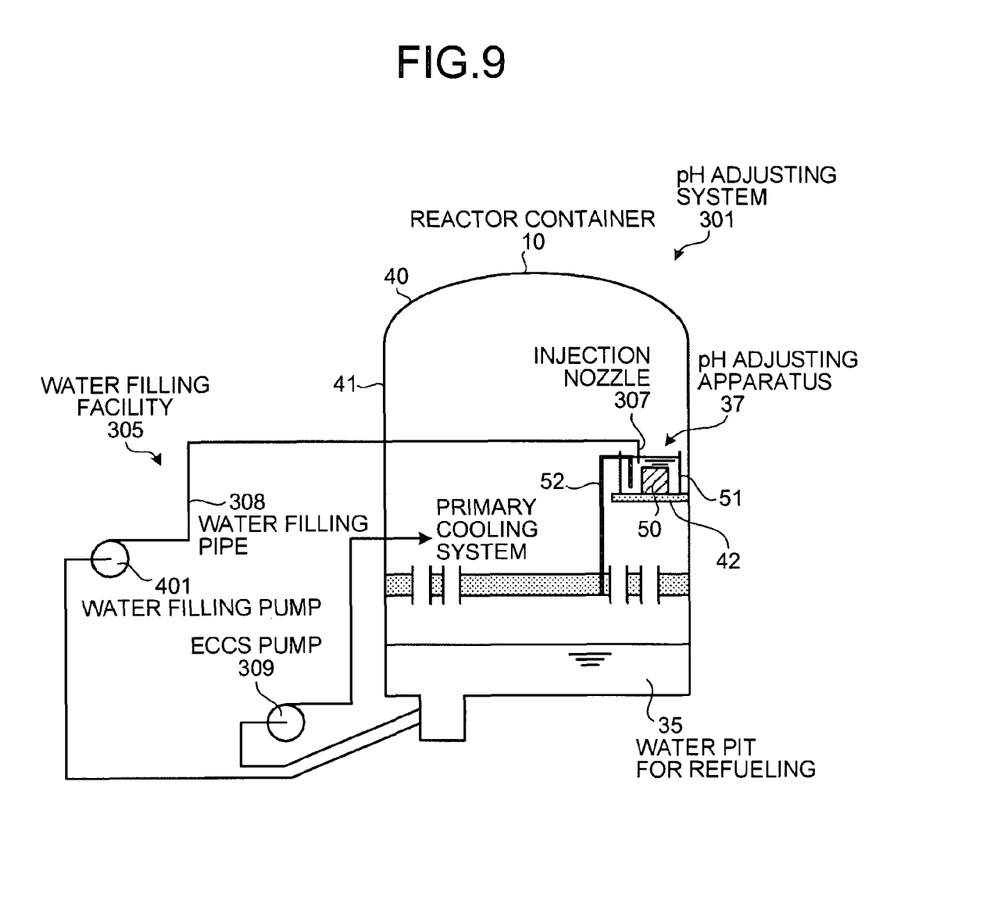
FIG. 9 is a schematic diagram of a pH adjusting system according to a modification of the third embodiment.

A modification of the pH adjusting system 301 according to the third embodiment is explained referring to FIG. 9. FIG. 9 is a schematic diagram of a pH adjusting system according to the modification of the third embodiment. In the third embodiment, the boric acid water is injected into the pH adjusting apparatus 37 by the ECCS pump 309. In the modification, the boric acid water is injected into the pH adjusting apparatus 37 by an exclusive water filling pump 401 separate from the ECCS pump 309.

The water filling facility 305 of the pH adjusting system 301 according to the modification of the third embodiment has the injection nozzle 307 for injecting the boric acid water into the pH adjusting apparatus 37, the water filling pipe 308 that connects the injection nozzle 307 and the water pit for refueling 35, and the water filling pump 401 interposed in the water filling pipe 308.

In the configuration described above, as in the first and third embodiments, the pH adjusting apparatus 37 can be configured to be capable of generating the pH-adjusted solution at abnormal time and cause the generated pH-adjusted solution to flow into the water pit for refueling 35 below the pH adjusting apparatus 37.

INDUSTRIAL APPLICABILITY

As described above, the pH adjusting system and the pH adjusting method according to the present invention is suitable for adjusting pH in a reactor container at abnormal time of a nuclear reactor stored in the reactor container.

The invention claimed is:

1. A pH adjusting system comprising:
   an internal water storage tank that is disposed in a reactor container, which stores a nuclear reactor, and is capable of storing cooling water;
   a spraying unit that sprays the cooling water stored in the internal water storage tank into an inside of the reactor container; and
   a pH adjusting apparatus that is disposed above the internal water storage tank and below the spraying unit, the pH adjusting apparatus including a container that has an opened top side and stores a pH adjuster, and an overflow pipe, wherein
   the overflow pipe is formed in a reversed U shape, an end of the overflow pipe is disposed in a lower portion of the container,
   a vent pipe with an opened end is provided to a top portion of the overflow pipe, and
   the pH adjusting apparatus causes a pH-adjusted solution generated by dissolving or mixing the pH adjuster to flow out via the overflow pipe to the internal water storage tank below the pH adjusting apparatus.

2. The pH adjusting system according to claim 1, wherein the pH adjuster is prepared in a powder state.

3. The pH adjusting system according to claim 1, further comprising a solvent injecting unit that is capable of injecting a solvent for dissolving or diluting the pH adjuster into the pH adjusting apparatus, and further comprising an external water storage tank that is provided on an outside of the reactor container and is capable of storing the solvent, wherein the solvent injecting unit injects the solvent, which is stored in the external water storage tank, into the pH adjusting apparatus.

4. The pH adjusting system according to claim 1, wherein the pH adjusting apparatus includes a basket containing the pH adjuster, and a basket housing container that houses the basket, and
   an inlet through which the solvent injected from the spraying unit flows in and an outlet from which the pH-adjusted solution generated by dissolving or mixing the pH adjuster in the solvent flows out to the internal water storage tank are formed in the basket housing container.

* * * * *